(12) United States Patent
Griessing

(10) Patent No.: US 7,461,118 B2
(45) Date of Patent: Dec. 2, 2008

(54) ARITHMETIC LOGIC UNIT WITH MERGED CIRCUITRY FOR COMPARISON, MINIMUM/MAXIMUM SELECTION AND SATURATION FOR SIGNED AND UNSIGNED NUMBERS

(75) Inventor: Alexander M. Griessing, Sunnyvale, CA (US)

(73) Assignee: Infineon Technologies AG (DE)

( * ) Notice: Subject to any disclaimer, the term of this patent is extended or adjusted under 35 U.S.C. 154(b) by 588 days.

(21) Appl. No.: 10/411,409

(22) Filed: Apr. 9, 2003

(65) Prior Publication Data

US 2004/0205094 A1 Oct. 14, 2004

(51) Int. Cl.
*G06F 7/38* (2006.01)
(52) U.S. Cl. ...................... 708/552; 708/530
(58) Field of Classification Search .............. 708/207, 708/530, 552, 553
See application file for complete search history.

(56) References Cited

U.S. PATENT DOCUMENTS

| 5,422,805 | A | * | 6/1995 | McIntyre et al. ............ 708/625 |
|---|---|---|---|---|
| 5,504,697 | A | * | 4/1996 | Ishida ........................ 708/552 |
| 5,715,186 | A | * | 2/1998 | Curtet ........................ 708/207 |
| 5,847,978 | A | * | 12/1998 | Ogura et al. ................ 708/552 |
| 5,889,689 | A | * | 3/1999 | Alidina et al. .............. 708/552 |
| 6,868,432 | B2 | * | 3/2005 | Fugger et al. ............... 708/670 |

* cited by examiner

*Primary Examiner*—Chuong D Ngo
(74) *Attorney, Agent, or Firm*—Dickstein, Shapiro, LLP.

(57) ABSTRACT

A saturation-capable arithmetic logic unit (ALU) includes a general-purpose comparator coupled to receive a data value and a saturation threshold value during a saturation operation. Using the general-purpose comparator of the ALU for saturation minimizes circuit area without adversely affecting microprocessor performance. In an unsigned saturation operation, the data value is replaced with the threshold value when the data value is greater than the threshold value. In a signed saturation operation, positive data values are compared with an upper threshold value and negative data values are compared with a lower threshold value. In this manner, the data value need only be compared to either the upper or lower threshold value, rather than both. If the data value falls outside the bounds set by the upper and lower threshold values, the data value is replaced with the nearest threshold value.

28 Claims, 11 Drawing Sheets

ARITHMETIC LOGIC UNIT WITH MERGED CIRCUITRY FOR COMPARISON, MINIMUM/MAXIMUM SELECTION AND SATURATION FOR SIGNED AND UNSIGNED NUMBERS

BACKGROUND OF THE INVENTION

1. Field of the Invention

The present invention relates to microprocessor architecture, and in particular, to a method and structure for performing saturation operations using the arithmetic logic unit of a microprocessor.

2. Discussion of Related Art

In a microprocessor, the width of the data that can be handled is generally determined by the width of the data path in the arithmetic logic unit (ALU) of the microprocessor. For example, a 32-bit microprocessor with a 32-bit wide ALU usually performs operations like addition, comparison, etc. on 32-bit wide data. However, a microprocessor may also include a set of instructions that is designed to operate on data restricted to bit widths less than the full data path width. For example, the 32-bit microprocessor may include some instructions to operate on 16-bit data.

Such a microprocessor capable of handling different data widths usually provides some means to convert data between these different data widths. Extending a "reduced width" data value to "full width" (e.g. extending 16-bit data to 32-bit) is trivial, and does not require any special provision. However, reducing the data width (e.g. reduction from 32-bit to 16-bit) is nontrivial, and the microprocessor could provide a saturation circuit for this purpose.

In a saturation operation, a data value is compared with saturation threshold values. If the comparison indicates that the data value is outside the allowable data range for the reduced data width, the data value is replaced with the saturation threshold value. If the data value is within the allowable range, it is not altered.

In an unsigned saturation operation, the data value is checked against a single (upper) saturation threshold value. If the data value is greater than the upper saturation threshold value, the data value is replaced with the upper saturation threshold value. For example, consider a reduced data width of 16-bit in a 32-bit microprocessor. The maximum allowable unsigned data value for the 16-bit data width is $2^{16}-1$ (i.e., a 16-bit number with each bit value equal to 1). For clarity and conciseness, binary value $2^{16}-1$ can be expressed as a hexadecimal value, i.e., 0x"0000_FFFF". The value $2^{16}-1$ therefore can be used as the upper saturation threshold value. A saturation operation would then replace any data value greater than with $2^{16}-1$ with $2^{16}-1$, whereas data values not greater then $2^{16}-1$ pass unchanged.

In a signed saturation operation, the data value is checked against both a positive upper saturation threshold value and a negative lower saturation threshold value. If the data value is greater than the upper saturation threshold value or less than the lower saturation threshold value, the data value is replaced with the upper or lower saturation threshold value, respectively. For example, returning to the reduced data width of 16-bit, the maximum allowable positive data value would be $2^{15}-1$ (0x"0000_7FFF"). The minimum allowable negative data value would be $-2^{15}$ (0x"FFFF_8000"). Any data value greater than $2^{15}-1$ would then be replaced with $2^{15}-1$, while any data value less than $-2^{15}$ would be replaced with $-2^{15}$. Any data value in between these two thresholds remains unchanged.

In a microprocessor, a standard arithmetic logic unit (ALU) typically includes adder logic for performing basic arithmetic operations and a single general-purpose min/max comparator for comparing data values and selecting a minimum or maximum. To implement a saturation instruction in a standard ALU, additional saturation-specific logic is typically required.

FIG. 1a shows a conventional saturation-capable ALU 100a, which comprises an n-bit min/max comparator 110 and an adder circuit 120a. ALU 100a is coupled to receive n-bit input words A[n−1:0] and B[n−1:0]. A min/max comparator circuit such as min/max comparator 110 drives an "equality" signal EQ, a "less than" signal LT, or a "greater than" signal GT to an active state if input word A[n−1:0] is equal to, less than, or greater than, respectively, input word B[n−1:0], and also determines the minimum or maximum of the two input words and provides the result as an n-bit output word Z[n−1:0]. Meanwhile, adder circuit 120a performs various arithmetic operations on n-bit input words A[n−1:0] and B[n−1:0], according to the controlling instruction set, and generates an n-bit output word Y[n−1:0].

To perform saturation operations, adder circuit 120a includes a saturation module 121. If ALU 100a is working on reduced-width data, n-bit input words A[n−1:0] and B[n−1:0] would represent m-bit data values, where m is less than n. Saturation module 121 would then compare word A[n−1:0] or word B[n−1:0] to a saturation threshold value T_sat to determine whether or not the limits of the reduced data width has been exceeded.

Because adder circuit 120a may already include some saturation functionality (e.g., saturated addition, etc.), merging saturation module 121 into the adder data path may provide some degree of layout efficiency. However, the overall speed of a microprocessor is typically determined by the logic depth of its adder data path. Therefore, incorporation of saturation module 121 into adder circuit 120a can have a negative impact on microprocessor performance.

FIG. 1b shows another example of a conventional saturation-capable ALU 100b. ALU 100b comprises an n-bit min/max comparator circuit 110, an adder 120b, and a dedicated saturation circuit 130. Comparator 110 is substantially the same as described with respect to FIG. 1a. However, unlike adder circuit 120a shown in FIG. 1a, adder circuit 120b does not include a saturation module. Instead, dedicated saturation circuit 130 executes all saturation instructions.

Because the saturation logic in ALU 100b is removed from the adder data path, efficient saturation operations can be performed. Furthermore, saturation circuit 130 would typically incorporate optimized logic that could carry out the saturation operations in an efficient manner. However, the addition of saturation circuit 130 as a separate functional block undesirably increases the area requirements of ALU 100b. This in turn can increase the manufacturing costs and power requirements for any microprocessor incorporating ALU 100b.

Hence there is a need for a method or system to provide saturation capability in a microprocessor that minimizes circuit area requirements without degrading overall performance.

SUMMARY

Accordingly, a microprocessor in accordance with one embodiment of the present invention includes an input control circuit for providing a saturation threshold value to the min/max comparator of the ALU, thereby allowing the ALU to determine whether an input data value has a magnitude greater than the desired bit width. By using the preexisting general-purpose min/max comparator in the ALU, the additional circuit area required for implementation of the saturation capability is minimized. Furthermore, this enhancement to the comparator logic does not have any negative impact on overall processor performance because the comparator logic has relatively few levels (compared to the adder logic).

According to an embodiment of the present invention, an ALU provides unsigned saturation capability via its general purpose min/max comparator. In response to a saturation control signal, an input control circuit sends a saturation threshold value to one input of the min/max comparator, where it is compared with a data value at the other input of the min/max comparator. If the data value is less than the saturation threshold value, it remains unchanged. Otherwise the data value is replaced with the saturation threshold value.

According to another embodiment of the present invention, an ALU providing unsigned and signed saturation capability includes a configurable unsigned/signed comparator circuit that includes the general purpose min/max comparator of the ALU. During a saturation operation, an input data value is compared with a selected saturation threshold value. The selected saturation threshold value can be set equal to an unsigned upper threshold value during unsigned saturation operations, to a signed upper threshold value during signed saturation operations on positive data values, and to a signed lower threshold value during signed saturation operations on negative data values. By assigning the selected saturation threshold value in this manner, the number of comparison operations required for performing saturation is limited to one.

In response to a saturation control signal and a sign control signal, an input control circuit generates either the unsigned upper threshold value or the signed upper threshold value. If the saturation control signal is asserted but the sign control signal is deasserted (i.e., an unsigned saturation operation is being performed), the input control circuit provides the unsigned upper threshold value. If both the saturation control signal and the sign control signal are asserted (i.e., a signed saturation operation is being performed), the input control circuit provides the signed upper threshold value. If an unsigned saturation operation is being performed, or if a signed saturation operation is being performed on a positive data value, the selected saturation threshold value is set equal to the unsigned upper threshold value or the signed upper threshold value, respectively, and is passed to the min/max comparator in the configurable signed/unsigned comparator circuit, along with the input data value. If the input data value is greater than the selected saturation threshold value, it is replaced with the selected saturation threshold value. Otherwise the data value remains unchanged.

If a signed saturation operation is being performed on a negative data value, the selected saturation threshold value is set equal to the inverse of the signed upper threshold value, and is passed to the min/max comparator along with the (negative) data value. Then, if the negative data value is less than the lower saturation threshold value, it is replaced with the lower saturation threshold value. Otherwise the data value remains unchanged.

The present invention will be more fully understood in view of the following description and drawings.

DETAILED DESCRIPTION

In accordance with the present invention, saturation capability can be efficiently incorporated into an ALU by using the existing ALU comparator in conjunction with appropriate control logic.

Unsigned Saturation

Figure 1A:
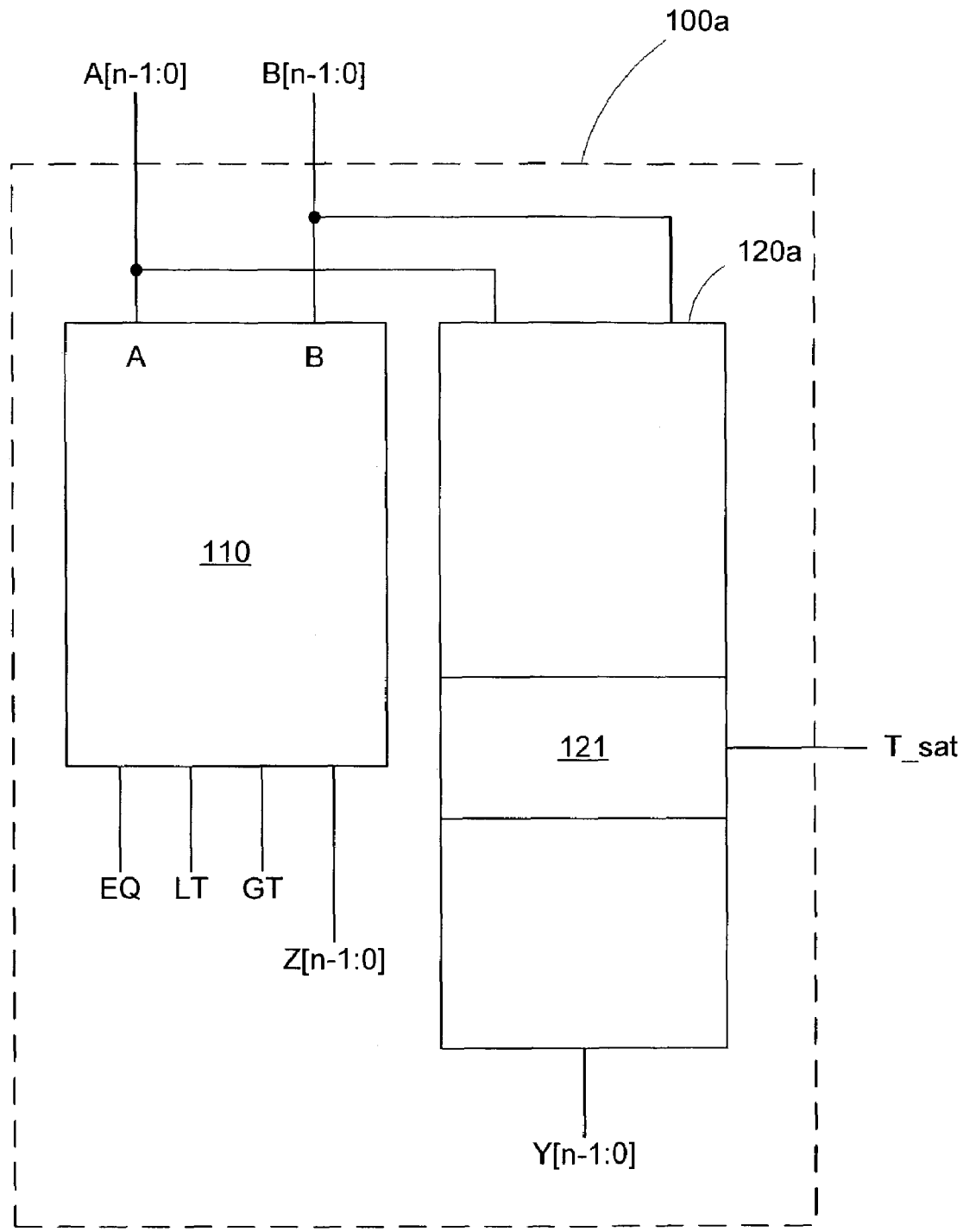
FIGS. 1a and 1b are conventional structures for performing saturation operations in a microprocessor.
Figure 1B:
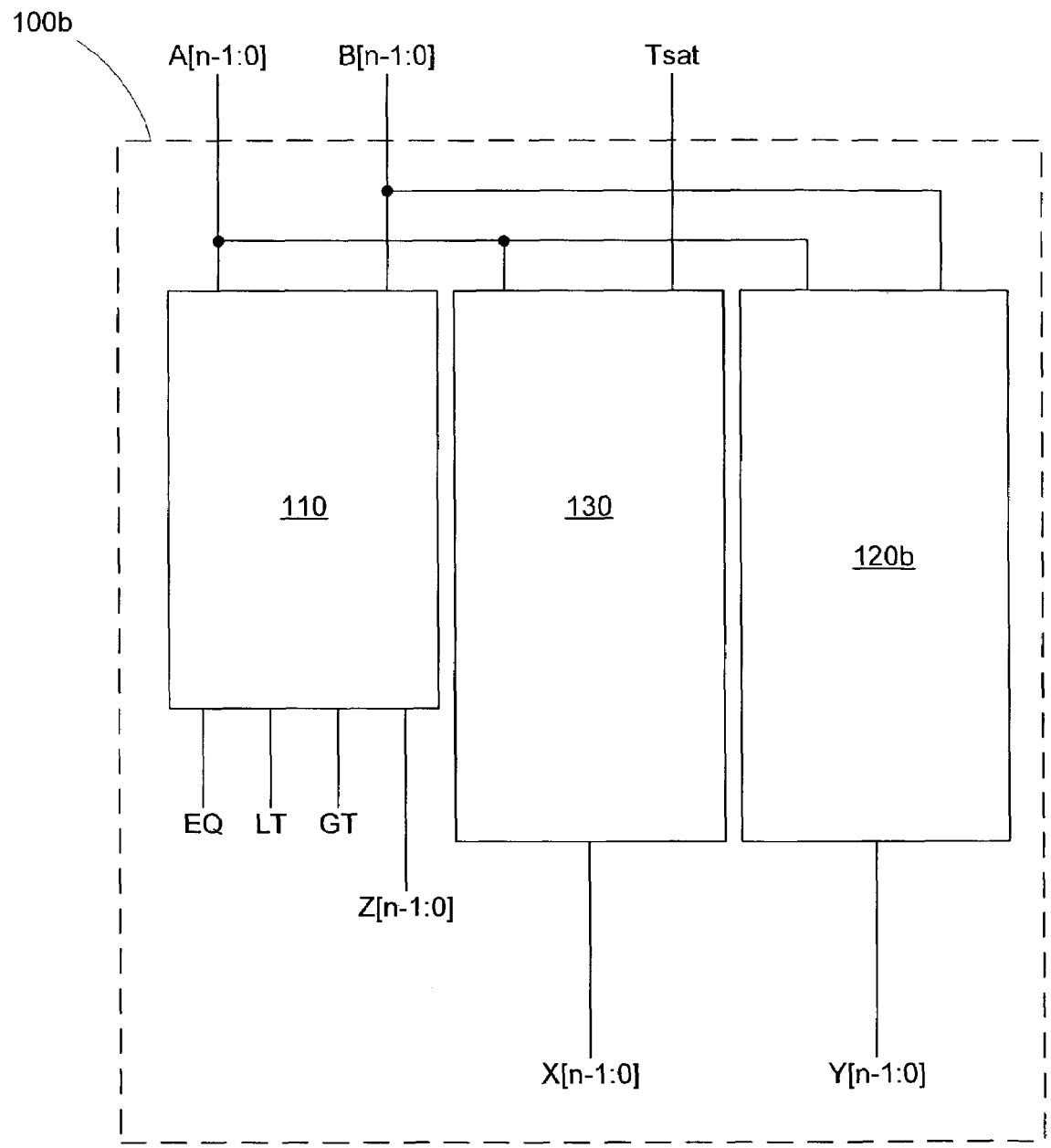
Figure 2A:
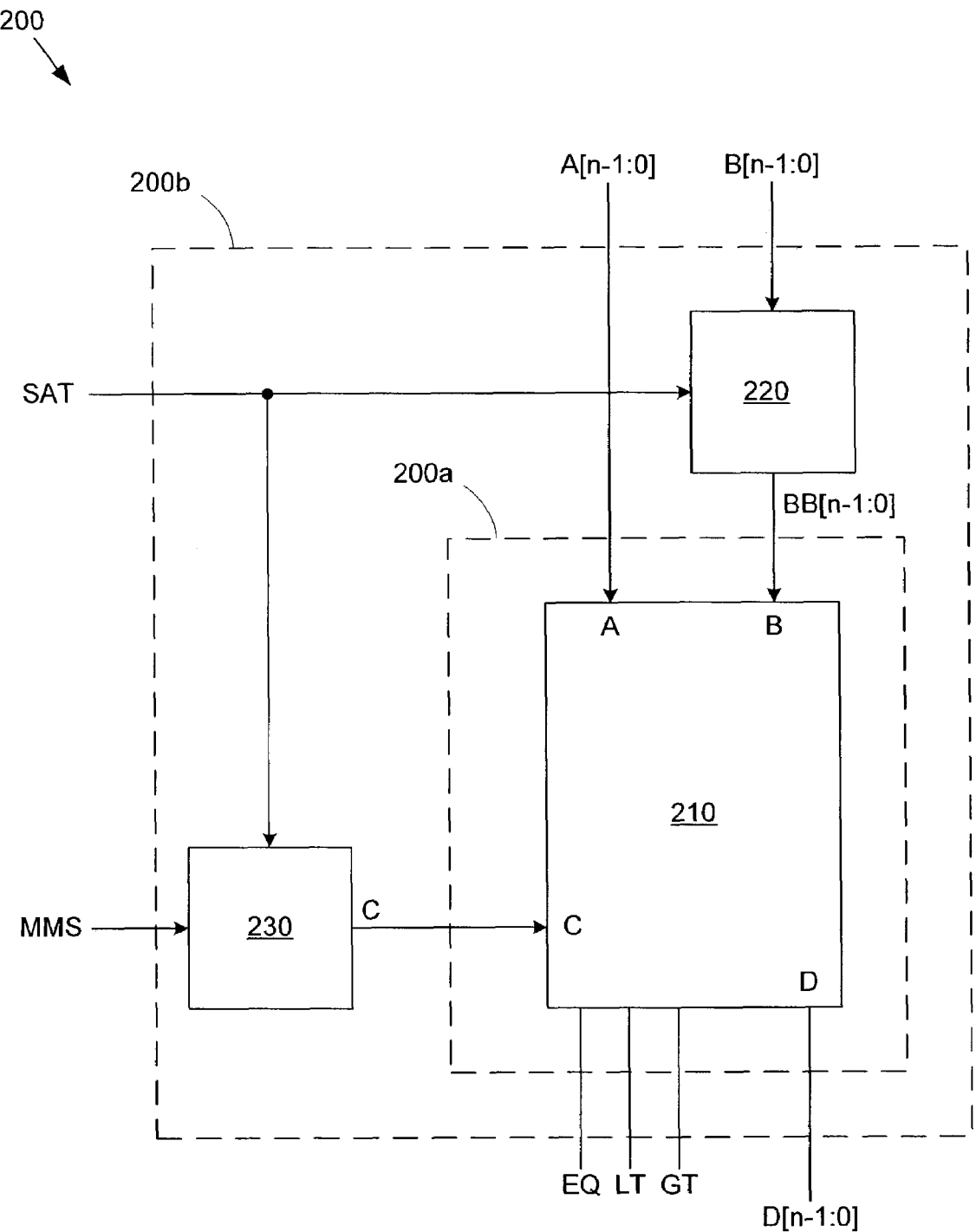
FIG. 2a is a schematic diagram of an arithmetic logic unit configured to perform unsigned saturation, in accordance with an embodiment of the present invention.

FIG. 2a shows a saturation-capable arithmetic logic unit (ALU) 200 including an n-bit comparator circuit 210 in accordance with an embodiment of the present invention. FIG. 2a also shows an input control circuit 220 and an output control circuit 230, both coupled to comparator circuit 210. According to one embodiment of the present invention, input control circuit 220 and output control circuit 230 are located outside ALU 200, as indicated by ALU boundary 200a. Alternatively, both circuits can be included within ALU 200, as indicated by ALU boundary 200b.

N-bit comparator circuit 210 comprises an input port A, an input port B, a control terminal C, an output port D, and comparison result output ports EQ, LT and GT. N-bit comparator circuit 210 is coupled to receive n-bit input words A[n−1:0] and BB[n−1:0] at input ports A and B, respectively, and a control signal C at control terminal C. One of the two input words is then provided as an n-bit output word D[n−1:0] at output port D, depending on the state of control signal C. Additionally, one of the three comparison result output signals EQ, LT and GT becomes active, based on the outcome of the comparison of the two input words A[n−1:0] and B[n−1:0].

Figure 2B:
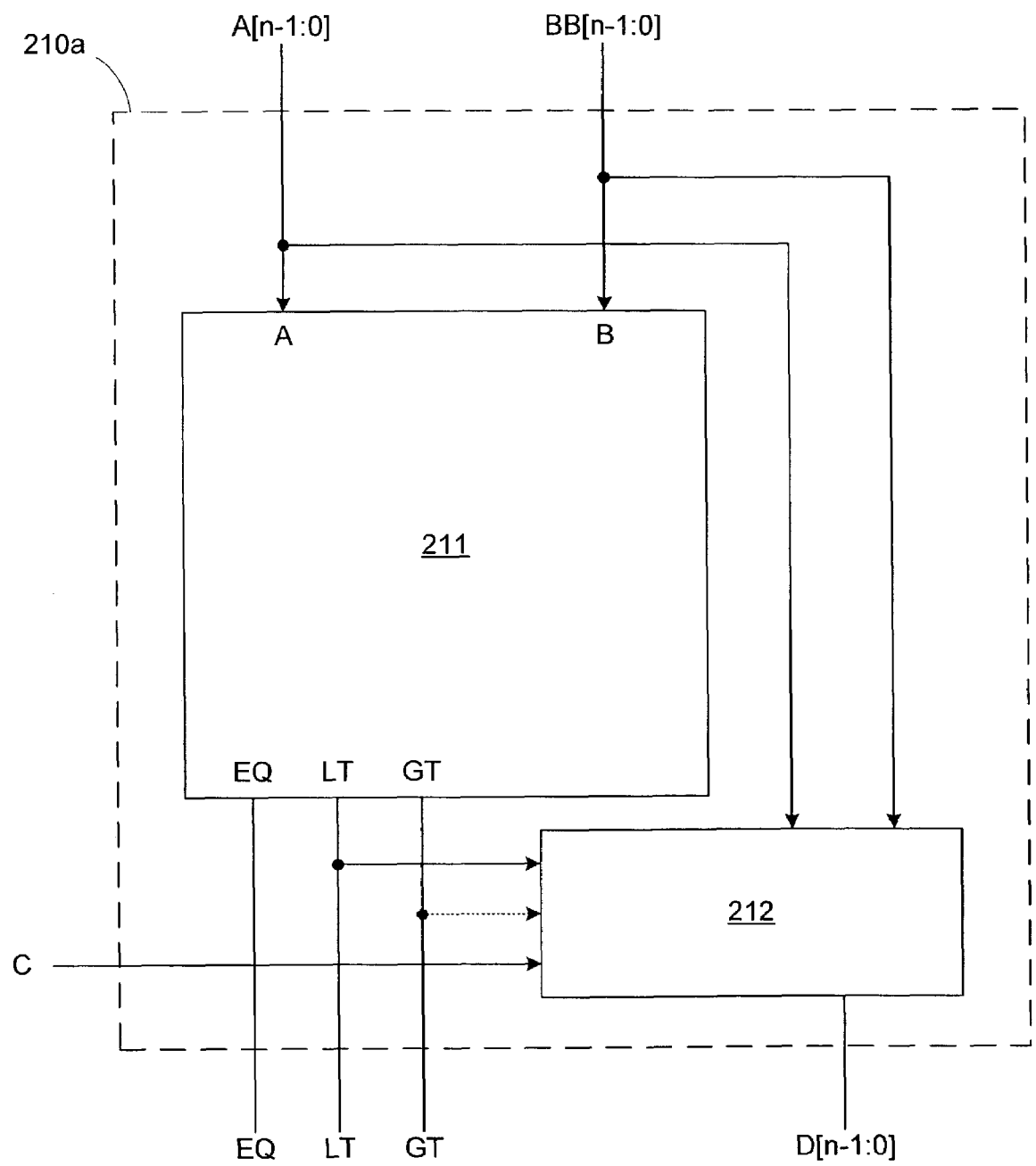
FIG. 2b is a schematic diagram of an unsigned comparator circuit for use in an unsigned saturation-capable ALU in accordance with an embodiment of the present invention.

Comparator circuit 210 uses the existing general-purpose min/max comparator in the ALU of a microprocessor. FIG. 2b shows a schematic diagram of comparator circuit 210, in accordance with an embodiment of the present invention. Comparator circuit 210 comprises an n-bit min/max comparator 211 and an output selection circuit 212. Min/max comparator 211 comprises input ports A and B, which are coupled to receive n-bit input words A[n−1:0] and BB[n−1:0], respectively.

Min/max comparator 211 compares input word A[n−1:0] to input word BB[n−1:0], and drives an "equality" signal EQ, a "less than" signal LT, or a "greater than" signal GT to an active state if input word A[n−1:0] is equal to, less than, or greater than, respectively, input word BB[n−1:0]. Note that while the particular embodiments of the present invention will be described using active HIGH signals (i.e., signals that are active when they are in a logic HIGH state), active LOW signals could just as well be used.

Figure 2C:
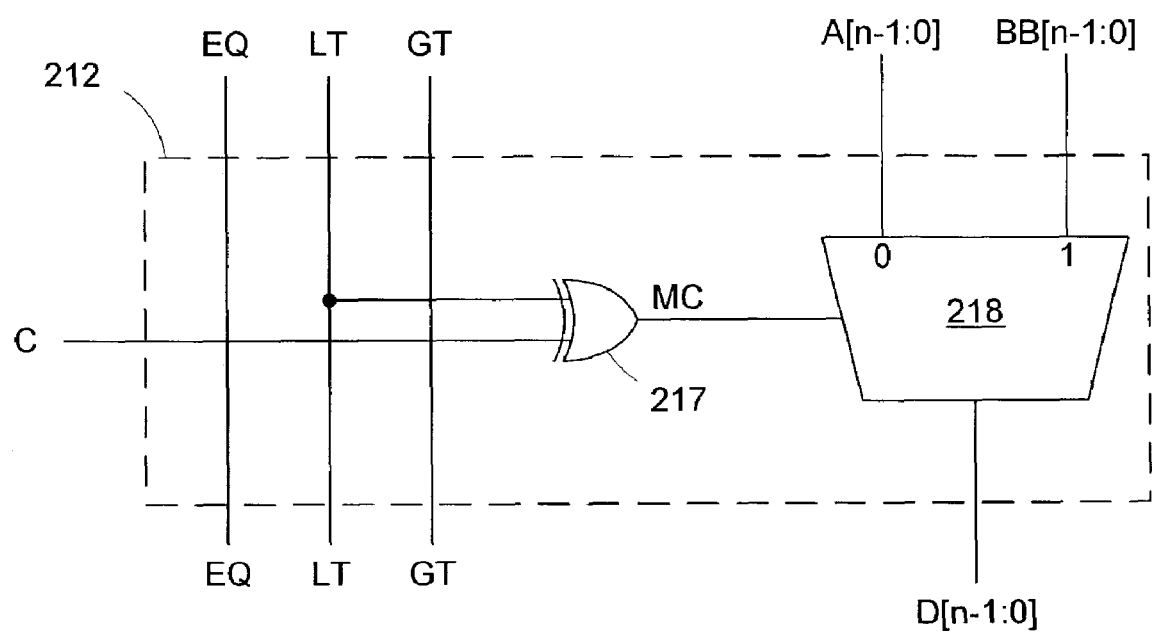
FIG. 2c is a schematic diagram of an output selection circuit for use in saturation logic, in accordance with an embodiment of the present invention.

Based on the states of output control signal C and signal LT (or, optionally, signal GT), output selection circuit 212 provides one of input words A[n−1:0] and BB[n−1:0] as output word D[n−1:0]. For example, FIG. 2c shows a schematic diagram of an output selection circuit 212 according to an embodiment of the present invention. Circuit 212 comprises an XOR gate 217 and a multiplexer 218. XOR gate 217 is coupled to receive output control signal C and "less than" signal LT, and generate a multiplexer control signal MC. Multiplexer 218 is coupled to receive input words A[n−1:0] and BB[n−1:0] and provide one of them as output word D[n−1:0], based on the state of signal MC.

In the embodiment shown in FIG. 2c, control signal C could comprise a "minimum select" signal. As noted previously with respect to FIG. 2b, comparator 211 drives signal LT to an active state (in this case a logic HIGH state) when input word A[n−1:0] is less than input word BB[n−1:0]. Therefore, when control signal C is driven to a logic HIGH state, multiplexer control signal MC is set to a logic LOW state when input word A[n−1:0] is less than input word BB[n−1:0]. Input word A[n−1:0], which is provided to the LOW input of multiplexer 218, would then be provided as output word D[n−1:0]. However, when input word A[n−1:0] is greater than input word BB[n−1:0], signal LT is driven to a logic LOW state, forcing multiplexer control signal MC to a logic HIGH state. This in turn causes input word BB[n−1:0], which is provided to the HIGH input of multiplexer 218, to be provided as output word D[n−1:0]. Thus, when control signal C ("minimum select" signal) is driven to a logic HIGH state, the minimum of input words A[n−1:0] and BB[n−1:0] is always provided as output word D[n−1:0].

According to another embodiment of the present invention, control signal C could represent a "maximum select" signal, in which case XOR gate 217 could be coupled to receive "greater than" signal GT. Then, multiplexer 218 would provide the maximum of input words A[n−1:0] and BB[n−1:0] as output word D[n−1:0] in response to a logic HIGH control signal C ("maximum select" signal).

Returning to FIG. 2a, saturation capability is provided in ALU 200 by input control circuit 220. Input control circuit 220 is coupled to receive n-bit input word B[n−1:0] and a saturation control signal SAT. If saturation control signal SAT is not in an active state, input control circuit 220 simply provides input word B[n−1:0] as input word BB[n−1:0] to input port B of comparator circuit 210. However, if signal SAT is in an active state, indicating that a saturation operation is carried out, input control circuit 220 sets word BB[n−1:0] to an upper saturation threshold value.

Figure 2D:
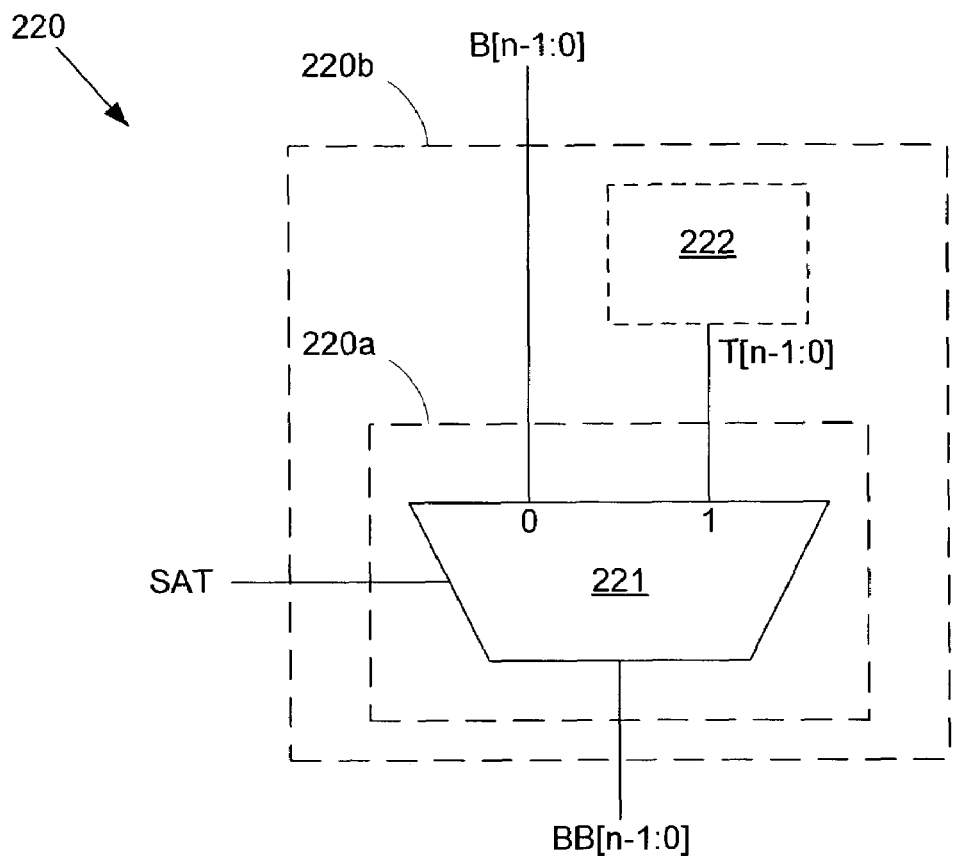
FIG. 2d is a schematic diagram of an input control circuit in accordance with an embodiment of the present invention.

FIG. 2d shows a schematic diagram of input control circuit 220 in accordance with an embodiment of the present invention. Input control circuit 220 comprises a multiplexer 221 coupled to receive input word B[n−1:0] and an upper saturation threshold value T[n−1:0]. Saturation threshold value T[n−1:0] represents the maximum allowable value for reduced-width data in the microprocessor. Saturation threshold value T[n−1:0] can be provided by an optional register 222 or can be provided from a different location in the microprocessor. As indicated by input control circuit boundary 220a, register 222 can be external to input control circuit 220. Alternatively, as indicated by input control circuit boundary 220b, register 222 can be included within input control circuit 220.

Depending on the state of saturation control signal SAT, either input word B[n−1:0] or upper saturation threshold value T[n−1:0] is provided as word BB[n−1:0] by multiplexer 221. In the embodiment of input control circuit 220 shown in FIG. 2d, driving saturation control signal SAT to a logic HIGH active state causes threshold value T[n−1:0] to be output as word BB[n−1:0] by multiplexer 221.

Returning once again to FIG. 2a, the final component of saturation capability for ALU 200 is provided by output control circuit 230, which is coupled to receive both saturation control signal SAT and a min/max selection control signal MMS. During non-saturation operation (i.e., comparison or min/max selection), output control circuit 230 provides min/max selection control signal MMS as output control signal C, which then determines the output word D[n−1:0] of comparator circuit 210. However, when saturation control signal SAT indicates that a saturation operation is being performed (i.e., when signal SAT is in an active state), output control circuit 230 sets output control signal C to a level that ensures proper saturation output from comparator circuit 210, regardless of the state of min/max selection control signal MMS.

For example, during a saturation operation, input control circuit 220 would set input word BB[n−1:0] equal to an upper saturation threshold value T[n−1:0]. Comparator circuit 210 would then set output D[n−1:0] equal to saturation threshold value T[n−1:0] for all values of input word A[n−1:0] greater than threshold value T[n−1:0]. If comparator circuit 210 includes the embodiment of output selection circuit 212 shown in FIG. 2c, then output control signal C would have to be an active HIGH signal (i.e., driven to a logic HIGH state during a saturation operation).

Figure 2E:
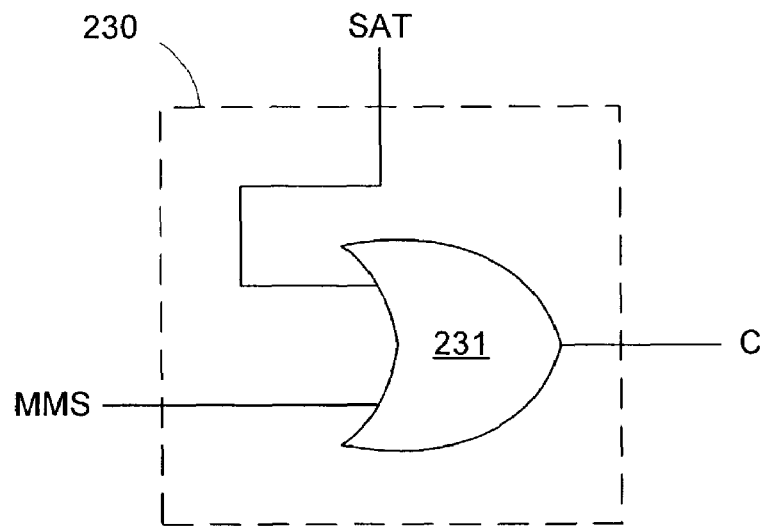
FIG. 2e is a schematic diagram of an output control circuit in accordance with an embodiment of the present invention.

This type of behavior could be provided as shown in FIG. 2e, which depicts a schematic diagram of output control circuit 230, in accordance with an embodiment of the present invention. Output control circuit 230 includes an OR gate 231 that provides either saturation control signal SAT or min/max selection control signal MMS as output control signal C. If saturation control signal SAT is not in an active state, output control signal C will always be equal to min/max selection control signal MMS, which then determines whether a minimum selection or maximum selection operation is performed. However, if saturation control signal SAT is in an active state (i.e., driven HIGH), output control signal C will be placed in a logic HIGH state, regardless of the state of min/max selection control signal MMS.

Thus, returning once again to FIG. 2a, input control circuit 220 and output control circuit 230 operate with n-bit comparator circuit 210 to enable the saturation capability of ALU 200. As described with respect to FIG. 2d, when saturation control signal SAT is driven to an active state during a saturation operation, input control circuit 220 provides an upper saturation threshold value T[n−1:0] to comparator circuit 210. An active saturation control signal SAT also causes output control circuit 230 to provide an appropriate output control signal C to comparator circuit 210, as described with respect to FIG. 2e. In response to control signal C, comparator circuit 210 then sets output word D[n−1:0] equal to the upper saturation threshold value T[n−1:0] when input word A[n−1:0] is greater than saturation threshold value T[n−1:0] (as described with respect to FIGS. 2b and 2c). In this manner, an unsigned saturation operation can be performed by ALU 200.

Signed Saturation

Figure 3A:
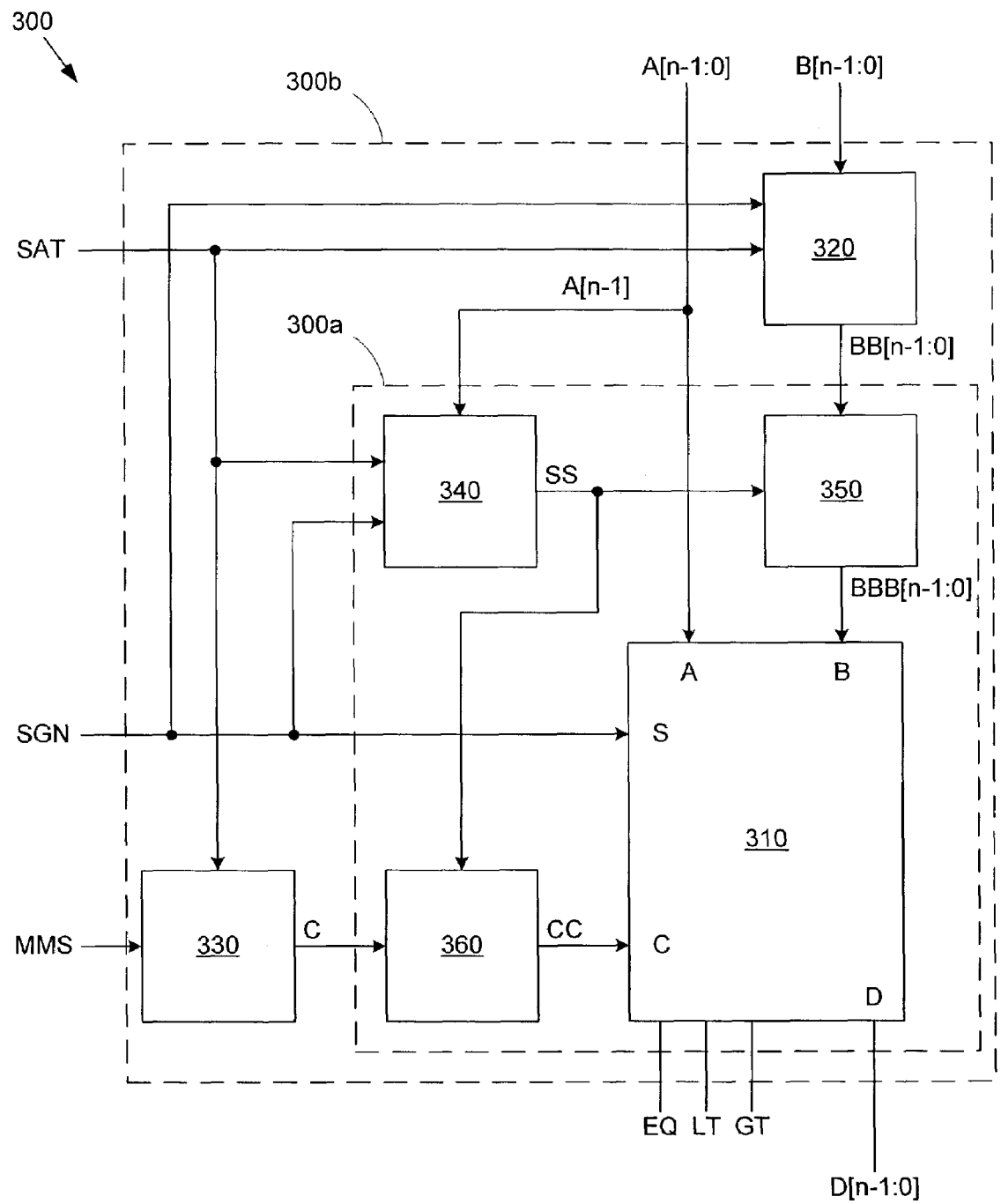
FIG. 3a is a schematic diagram of an arithmetic logic unit configured to perform unsigned and signed saturation, in accordance with an embodiment of the present invention.

FIG. 3a shows an ALU 300 that provides both unsigned and signed saturation capabilities. ALU 300 includes an n-bit configurable unsigned/signed min/max comparator circuit 310, a primary input control circuit 320, a secondary input control circuit 350, a primary output control circuit 320, a secondary output control circuit 360, and a negative signed saturation detect circuit 340. According to an embodiment of the present invention, primary input control circuit 320 and primary output control circuit 330 can be located outside ALU 300, as indicated by ALU boundary 300a. According to another embodiment of the present invention, primary input control circuit 320 and primary output control circuit 330 can be included in ALU 300, as indicated by ALU boundary 300b.

Configurable unsigned/signed min/max comparator circuit 310 includes an input port A, an input port B, a sign control terminal S, an output control terminal C, an output port D, and output ports EQ, LT and GT. Input ports A and B are coupled to receive n-bit input words A[n−1:0] and BBB[n−1:0], respectively. Comparator circuit 310 then performs either a signed or unsigned comparison of input words A[n−1:0] and BBB[n−1:0], depending on the state of a sign control signal SGN at sign control terminal S. Based on the comparison result one of the three output signals EQ, LT and GT goes to an active state. Finally, depending on the state of an output control signal CC at output control terminal C, one of input words A[n−1:0] and BBB[n−1:0] is output at output port D as an n-bit output word D[n−1:0].

Figure 3B:
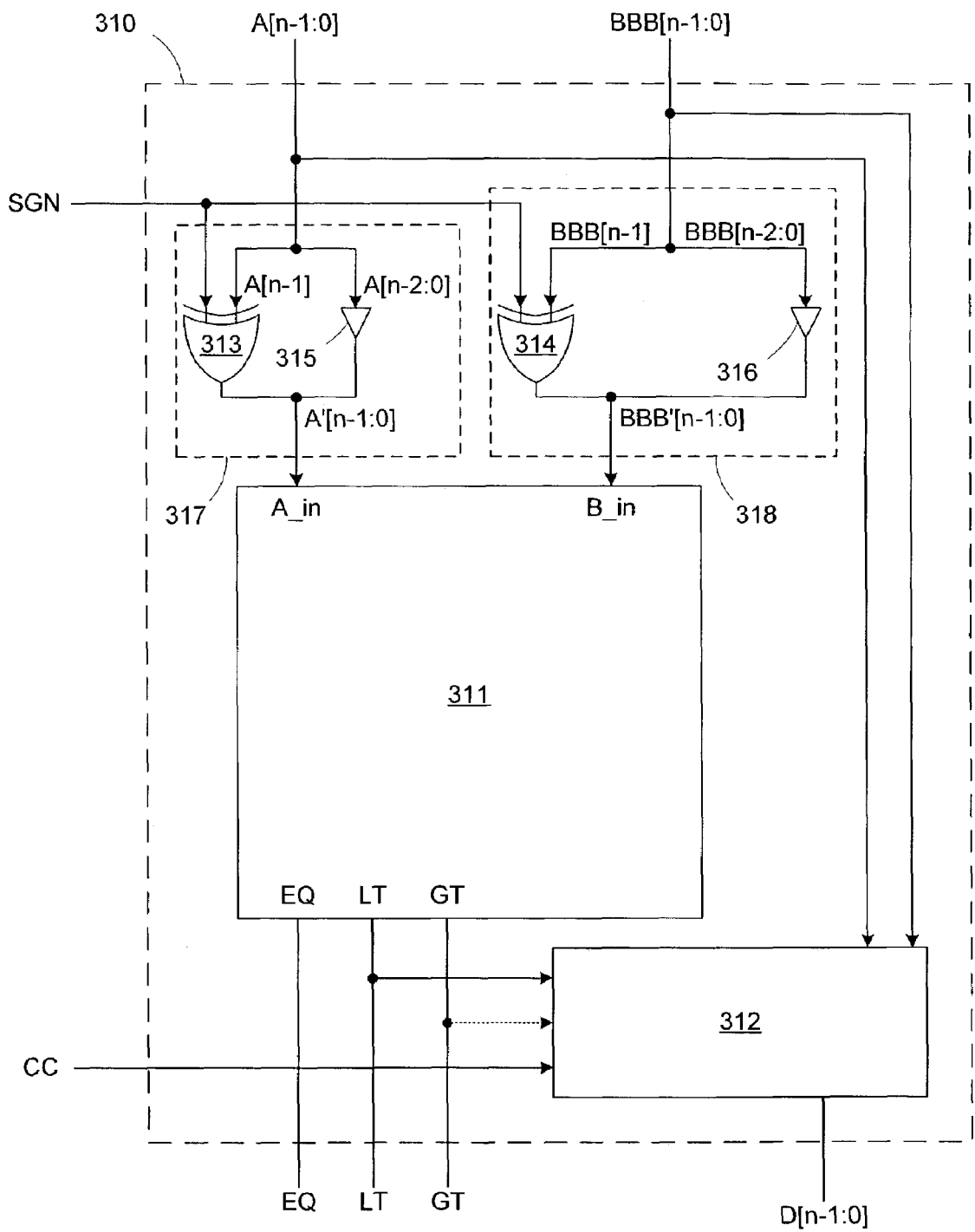
FIG. 3b is a schematic diagram of a configurable unsigned/signed comparator circuit for use in either an unsigned saturation-capable or a signed-saturation-capable ALU in accordance with embodiments of the present invention.

FIG. 3b shows a schematic diagram of a configurable unsigned/signed min/max comparator circuit 310, in accordance with an embodiment of the present invention. Like unsigned min/max comparator circuit 210 shown in FIG. 2b, the unsigned/signed min/max comparator circuit 310 makes use of the existing min/max general-purpose comparator in an ALU. Thus, like unsigned min/max comparator circuit 210, the unsigned/signed min/max comparator circuit 310 comprises an n-bit min/max comparator 311 and an output selection circuit 312. Min/max comparator 311 and output selection circuit 312 operate as described with respect to FIG. 2b, providing either input word A[n−1:0] or BBB[n−1:0] as output word D[n−1:0], depending on the state of output control signal CC.

However, min/max comparator circuit 310 further comprises input control circuits 317 and 318 to provide signed comparison capability. Signed comparison operations can be performed using a min/max comparator if the most significant bit (MSB) of each input word is inverted before being passed to the min/max comparator. Accordingly, input control circuits 317 and 318 are configured to invert the MSBs of input words A[n−1:0] and BBB[n−1:0] during a signed operation. According to an embodiment of the present invention, input control circuit 317 comprises an XOR gate 313 coupled to receive sign control signal SGN and the MSB of input word A[n−1:0] (i.e., A[n−1]), and a buffer 415 coupled to receive the remainder of input word A[n−1:0] (i.e., A[n−2:0]). Therefore, if the sign control signal SGN is an active HIGH signal, the MSB of input word A[n−1:0] will be inverted to generate a secondary input word A'[n−1:0] when signal SGN is in an active state to indicate signed operation. During unsigned operation, when control signal SGN is in an inactive state, word A'[n−1;0] would be equal to input word A[n−1:0].

Similarly, in accordance with an embodiment of the present invention, input control circuit 418 comprises an XOR gate 314 coupled to receive sign control signal SGN and the MSB of input word BBB[n−1:0], and a buffer 316 coupled to receive the remainder of input word BBB[n−1:0]. Once again, when sign control signal SGN is driven to an active state (in this case a logic HIGH state), an intermediate input word BBB'[n−1:0] is set equal to input word BBB[n−1:0] with an inverted MSB, while during an unsigned operation, word BBB'[n−1:0] would simply be equal to input word BBB[n−1:0].

In this manner, min/max comparator 311 can be used to perform unsigned and signed comparison. The desired output D[n−1:0] can then be provided by output selection circuit 312, in a manner substantially similar to that described with respect to unsigned comparator circuit 210 shown in FIG. 2b.

Returning to FIG. 3a, the unsigned and signed saturation capabilities of ALU 300 are based on the operation of primary input control circuit 320 and secondary input control circuit 350. Primary input control circuit 320 is coupled to receive input word B[n−1:0] and provides intermediate word BB[n−1:0] based on the state of saturation control signal SAT and sign control signal SGN. Primary input control circuit 320 provides sets intermediate word BB[n−1:0] to different values, depending on whether a non-saturation, unsigned saturation, or signed saturation operation is being performed.

Figure 3C:
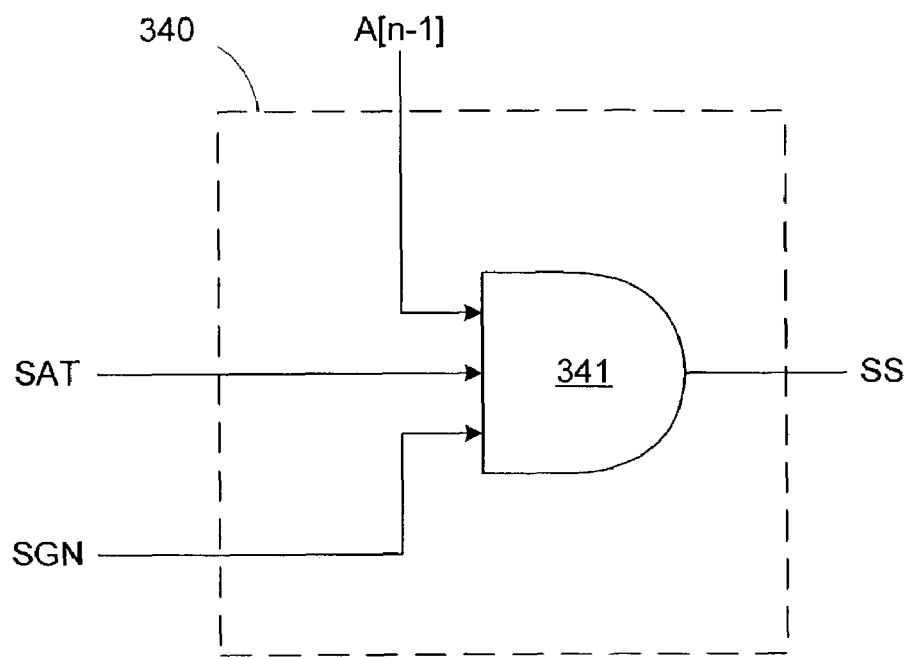
FIG. 3c is a schematic diagram of a negative signed saturation detect circuit in accordance with an embodiment of the present invention.
Figure 3D:
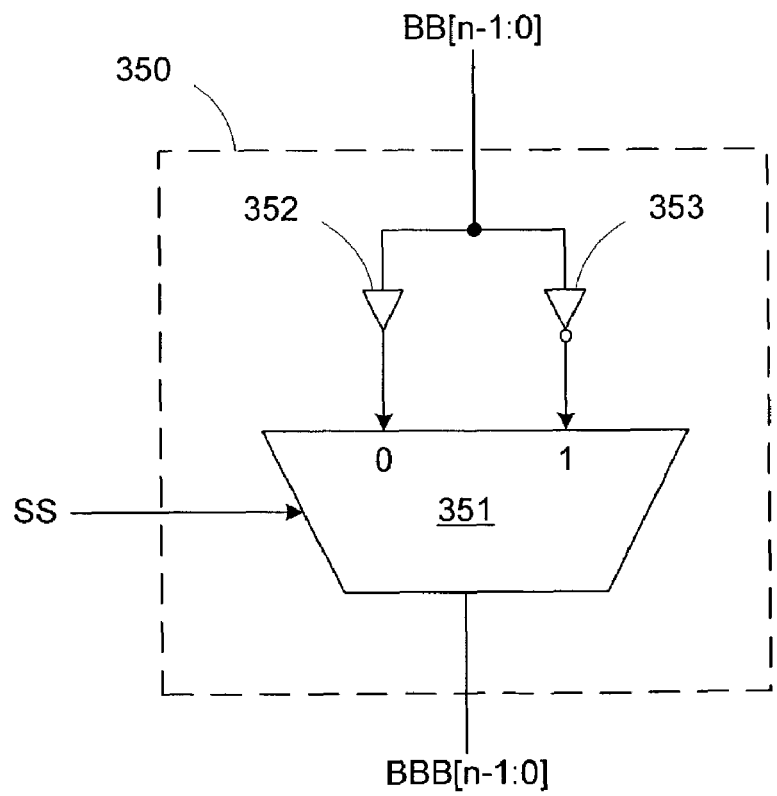
FIG. 3d is a schematic diagram of an input control circuit in accordance with an embodiment of the present invention.
Figure 3E:
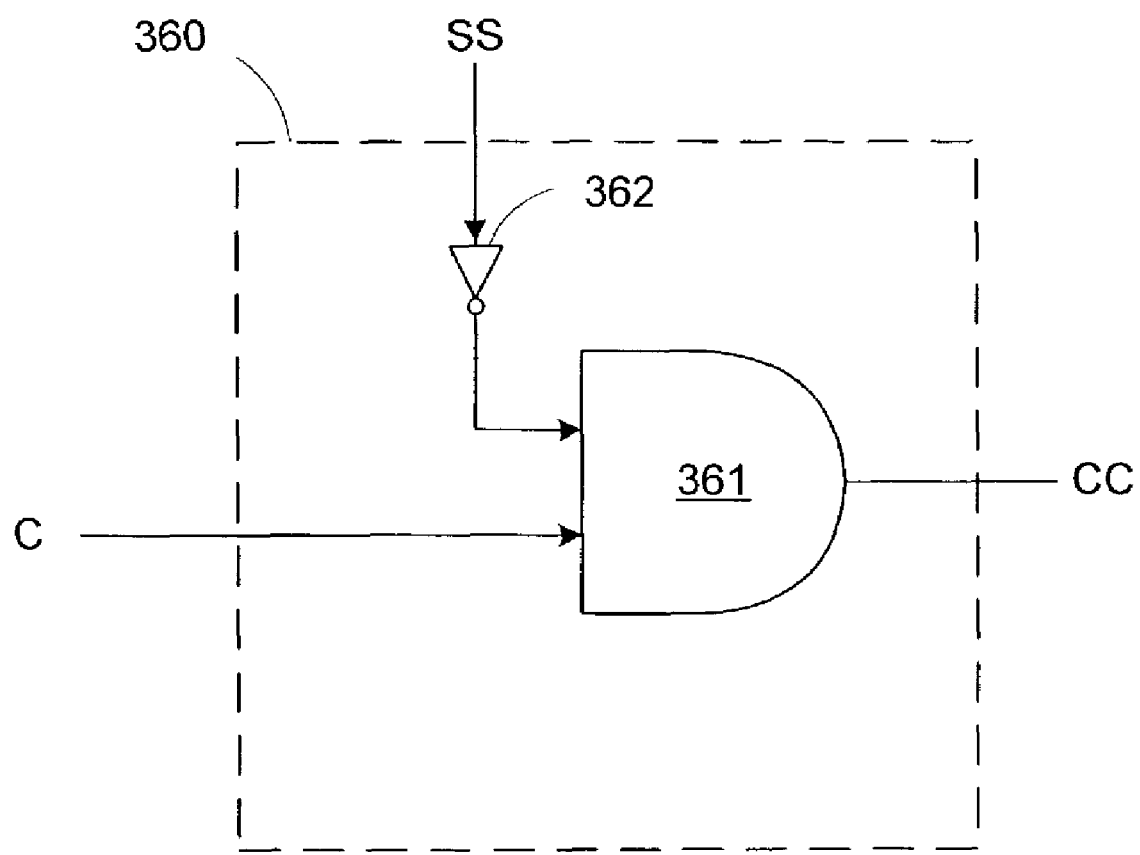
FIG. 3e is a schematic diagram of an output control circuit in accordance with an embodiment of the present invention.
Figure 3F:
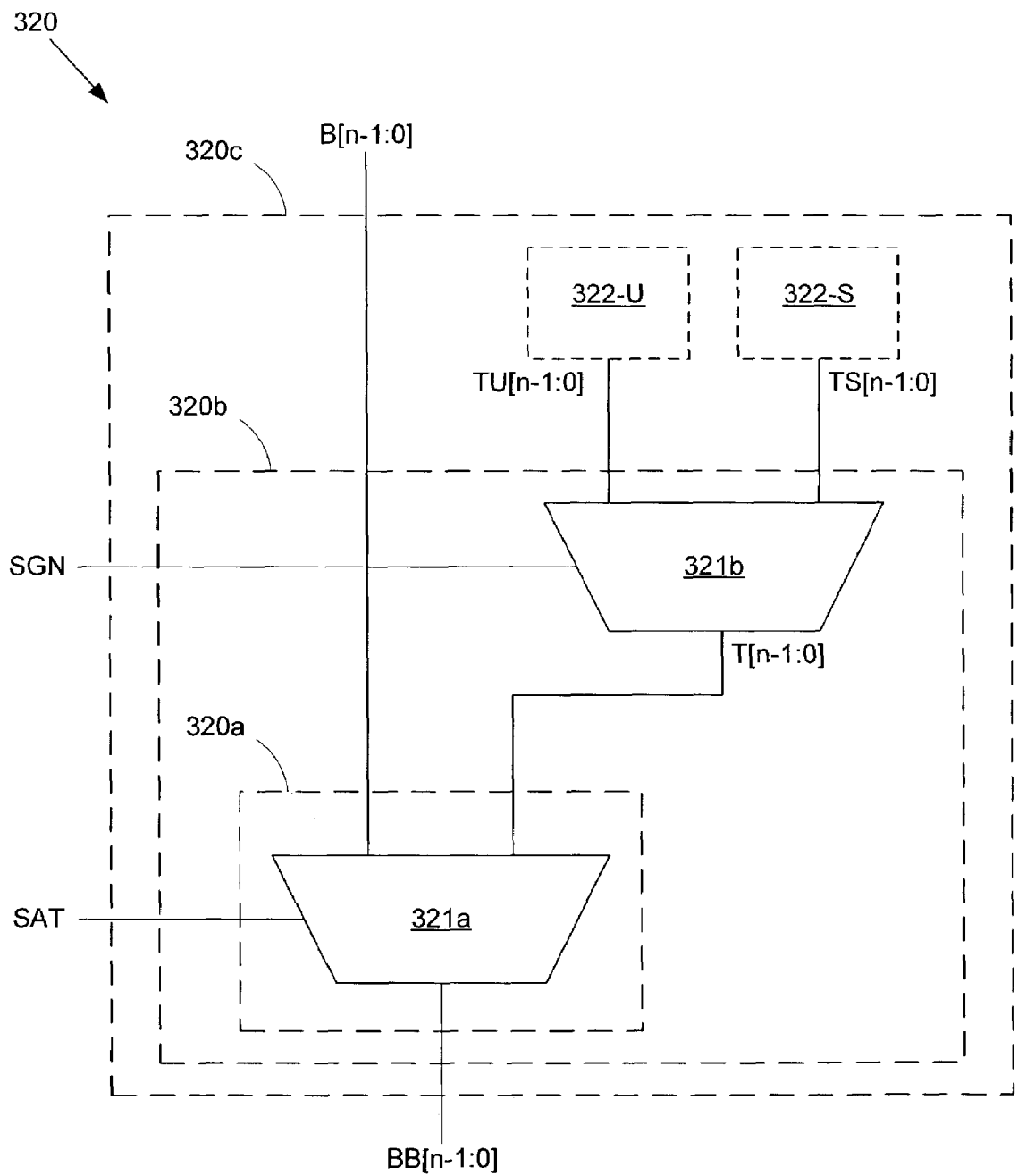
FIG. 3f is a schematic diagram of a primary input control circuit in accordance with an embodiment of the present invention.

FIG. 3f shows a schematic diagram of primary input control circuit 320 in accordance with an embodiment of the present invention. Primary input control circuit 320 comprises a first multiplexer 321b coupled to receive as inputs an unsigned upper threshold value TU[n−1:0] and a signed upper threshold value TS[n−1:0]. Sign control signal SGN is provided to the control terminal of multiplexer 321b, so that when an unsigned saturation operation is being performed (i.e., sign control signal SGN is inactive), multiplexer 321b outputs unsigned upper threshold value TU[n−1:0] as an upper saturation threshold value T[n−1:0]. On the other hand, if a signed saturation operation is being performed (i.e., sign control signal SGN is active), multiplexer 321b outputs signed upper threshold value TS[n−1:0] as upper saturation threshold value T[n−1:0].

Primary input control circuit 320 also includes a second multiplexer 321a coupled to receive input word B[n−1:0] and upper saturation threshold value T[n−1:0] from first multiplexer 321b. If signal SAT is not in an active state, intermediate word BB[n−1:0] is set equal to input word B[n−1:0]. However, if signal SAT is driven to an active state, intermediate word BB[n−1:0] is set equal to upper saturation threshold value T[n−1:0]. The specific value of this upper saturation threshold value is then determined by the state of sign control signal SGN.

Note that unsigned upper threshold value TU[n−1:0] does not equal signed upper threshold value TS[n−1:0] because the first bit of a signed value is used to indicate the sign of the value. For example, as described above, a 16-bit unsigned upper threshold value would be 216−1, while a 16-bit signed upper threshold value would be 215−1. Note further that upper threshold values TU[n−1:0] and TS[n−1:0] could be provided by optional registers 322-U and 322-S, respectively, or could be provided from a different location in the microprocessor. Also, as indicated by example primary input control circuit boundaries 320a, 320b, and 320c, primary input control circuit 320 could include just multiplexer 321a, both multiplexers 321a and 321b, or multiplexers 321a and 321b and optional registers 322-U an 322-S, respectively.

Returning to FIG. 3a, secondary input control circuit 350 then receives intermediate word BB[n−1:0] and provides input word BBB[n−1:0] to input port B of comparator circuit 310. If a non-saturation operation (i.e., comparison or min/ max selection) is being performed, secondary input control circuit simply provides intermediate word BB[n−1:0] as input word BBB[n−1:0]. Similarly, if an unsigned saturation operation is being performed, or if a signed saturation operation is being performed on a positive value, the (upper) saturation threshold value provided by primary input control circuit 320 can be passed directly to comparator circuit 310.

However, if a signed saturation operation is being performed, and if input word A[n−1:0] is a negative (signed) number, secondary input control circuit 350 must convert the upper signed saturation threshold value provided by primary input control circuit 320 to a proper lower signed saturation threshold value. The first step in this process is therefore to detect the concurrent existence of a signed saturation operation and a negative input word A[n−1:0]). This detection is performed by negative signed saturation detect circuit 340, which is coupled to receive saturation control signal SAT, sign control signal SGN, and the MSB of input word A[n−1:0] (i.e., A[n−1]).

FIG. 3c shows a schematic diagram of negative signed saturation detect circuit 340, in accordance with an embodiment of the present invention. Circuit 340 comprises a three-input AND gate, coupled to receive saturation control signal SAT, sign control signal SGN, and MSB A[n−1]. Therefore, if signals SAT and SGN are both active HIGH signals, when signals SAT and SGN are both active and MSB A[n−1] is logic HIGH (indicating a signed saturation operation on a negative input word A[n−1:0]), a negative signed saturation signal SS is driven HIGH, indicating that a lower signed saturation threshold value must be generated.

Returning to FIG. 3a, once negative signed saturation detect circuit 340 determines that a signed saturation operation is being performed on a negative value, secondary input control circuit 350 must provide an appropriate lower signed saturation threshold value to comparator circuit 310. This lower signed saturation threshold value can be generated by inverting the upper signed saturation threshold value provided by primary input control circuit 320, due to the binary symmetry of upper and lower signed saturation threshold values. For example, the upper signed saturation threshold value for a signed 8-bit number would be 127 (i.e., binary 01111111). The lower saturation threshold value for a signed 8-bit number would be −128 (i.e., binary 10000000). The same principle would apply to data of any bit-width.

FIG. 3d shows a schematic diagram of secondary input control circuit 350, in accordance with an embodiment of the present invention. Input control circuit 350 comprises a buffer 352 and an inverter 353, each coupled to receive intermediate word BB[n−1;0]. Buffer 352 and inverter 353 both feed into a multiplexer 351, the output of which is determined by the state of negative signed saturation signal SS. If negative signed saturation signal SS is driven HIGH (indicating a signed saturation operation on a negative value), the inverted value of word BB[n−1:0] is provided as word BBB[n−1:0]. Otherwise, word BBB[n−1:0] is set equal to word BB[n−1:0].

Returning to FIG. 3a, the final element of the signed saturation capability of ALU 300 is provided by primary output control circuit 330 and secondary output control circuit 360, which are serially coupled to control terminal C of comparator circuit 310. Output control circuits 330 and 360 must provide the appropriate output control signal CC to control terminal C, so that the proper output data value D[n−1:0] is provided at output port D.

For example, if input word A[n−1:0] is non-negative (i.e., an unsigned saturation operation is being performed so input word A[n−1:0] is unsigned, or if a signed saturation operation is being performed and input word A[n−1:0] is positive), then input word BBB[n−1:0] will be equal to the upper saturation threshold value. In that case, signed comparator circuit 310 should be instructed to output the minimum of input words A[n−1:0] and BBB[n−1:0]. However, if a signed saturation operation is being performed on a negative data value (i.e., input word A[n−1:0] is negative), then input word BBB[n−1:0] will be equal to the lower saturation threshold value. In that case, signed comparator circuit 310 should be instructed to output the maximum of input words A[n−1:0] and BBB[n−1:0]. If on the other hand a minimum or maximum select operation is being performed, the min/max select control signal MMS must be passed directly to control terminal C of comparator circuit 310.

Primary output control circuit 330 and secondary output control circuit 360 work together to provide this functionality. Primary output control circuit 330 is substantially similar in both structure and operation to output control circuit 230 shown in FIG. 2e. When saturation control signal SAT indicates that a saturation operation is being performed, output control circuit 330 sets output control signal C to a level that ensures proper unsigned saturation output from comparator circuit 310. For example, if signed comparator circuit 310 includes the output selection circuit 212 shown in FIG. 2c, the assertion of saturation control signal SAT would cause primary output control circuit 330 to drive control signal C to a logic HIGH level.

Control signal C is then routed to secondary output control circuit 360 which, in response, provides a control signal CC to comparator circuit 310. If a signed saturation operation is being performed on a negative data value, then secondary output control circuit 360 modifies control signal C to ensure that comparator circuit 310 outputs the maximum of input words A[n−1:0] and BBB[n−1:0]. Otherwise, secondary output control circuit merely passes control signal C on as control signal CC, so that comparator circuit 310 outputs the minimum of input words A[n−1:0] and BBB[n−1:0].

FIG. 3e shows a schematic diagram of secondary output control circuit 360, according to an embodiment of the present invention. An AND gate 361 is coupled to receive negative signed saturation signal SS inverted by inverter 362, and output control signal C, producing output control signal CC in response.

If negative signed saturation signal SS is driven HIGH (indicating a signed saturation operation on a negative value), the inverter 362 will provide a logic LOW input to AND gage 361. Therefore, during a signed saturation on a negative value, the output of AND gate 361 (i.e., output control signal CC) will always be in a logic LOW state, regardless of the state of output control signal C. If negative signed saturation signal SS is not driven HIGH (indicating either an unsigned saturation operation, a signed saturation operation on a positive data value, or a non-saturation operation), output control signal CC is set equal to the value of output control signal C. For example, if output control signal C is in a logic HIGH state (indicating that a saturation or minimum-select operation is being performed), output control signal CC will likewise be driven HIGH.

This embodiment of secondary output control circuit 360 could be used, for example, with a comparator circuit 310 that includes an output selection circuit 312 having the same configuration as output selection circuit 212 shown in FIG. 2c. Then, during a signed saturation operation on a negative data value (i.e., negative signed saturation signal SS in a logic HIGH state), the resulting logic LOW output control signal CC would cause comparator circuit 310 to provide the maximum of input words A[n−1:0] and BBB[n−1:0] as output D[n−1:0]. During an unsigned saturation operation or a signed saturation operation on a positive data value (i.e., negative signed saturation control signal SS in a logic LOW state), output control signal CC would be placed in a logic HIGH state, tracking the logic HIGH state of output control signal C. Comparator circuit 310 would then properly output the minimum of input words A[n−1:0] and BBB[n−1:0].

In this manner, ALU 300 provides signed (and unsigned) saturation capability. As described with respect to FIG. 3a, when saturation control signal SAT is driven to an active state (logic HIGH), primary input control circuit 320 provides an upper saturation threshold value to secondary input control circuit 350. Saturation control signal SAT also causes primary output control circuit 330 to provide the appropriate control signal for an unsigned saturation operation (or a signed saturation operation on a positive data value) to secondary output control circuit 360. Meanwhile, negative signed saturation detect circuit 340 monitors saturation control signal SAT, sign control signal SGN, and input word A[n−1:0]. If sign control signal SGN is not driven to an active state (i.e., if a signed saturation operation is not being performed), or if sign control signal SGN is driven to an active state (logic HIGH) but input word A[n−1:0] is positive (i.e., indicating a signed saturation operation on a positive value), negative signed saturation detect circuit 340 has no effect on the operation of ALU 300. Therefore, secondary input circuit 350 and secondary output circuit 360 simply pass their respective inputs directly to comparator circuit 310, and the minimum of input word A[n−1:0] and the upper saturation threshold value is provided as output data value D[n−1:0]. However, if sign control signal SGN is driven to an active state, and input word A[n−1:0] is negative (i.e., the MSB of input word A[n−1:0] is equal to 1), negative signed saturation detect circuit 340 drives negative signed saturation control signal SS to a logic HIGH state, which causes secondary input control circuit 350 to invert the upper saturation threshold value provided by primary input control circuit 320 to generate a lower saturation threshold value. Negative signed saturation control signal SS also causes secondary output control circuit 360 to provide the appropriate control signal for a negative signed saturation operation to comparator circuit 310. Then, the maximum of input word A[n−1:0] and the lower saturation threshold value is provided as output data value D[n−1:0].

In the various embodiments of this invention, novel structures and methods have been described to efficiently implement saturation capability in the ALU of a microprocessor. By using the existing min/max comparator in an ALU to perform the saturation operations, circuit area can be minimized. At the same time, by removing the saturation operation from the adder data path of the ALU, overall performance of the microprocessor is not degraded.

The various embodiments of the structures and methods of this invention that are described above are illustrative only of the principles of this invention and are not intended to limit the scope of the invention to the particular embodiments described. For example, in view of this disclosure, those skilled in the art can define other input control circuits, output control circuits, output selection circuits, and so forth, and use these alternative features to create a method or system according to the principles of this invention. The present invention could also be used to perform a signed or unsigned limiting operation, where the saturation threshold value(s) would be replaced with user-defined threshold value(s). Then, any values beyond the user-defined threshold value(s) would be limited to the user-defined threshold value(s). Alternatively, the invention could be used to perform a "inverse limiting" function, in which all values not greater than an upper user defined threshold value (or not less than a user-defined lower threshold value) would be mapped to the user-defined threshold value. Thus, the invention is limited only by the following claims.

I claim:

1. An arithmetic logic unit (ALU) comprising:
    an input control circuit coupled to receive a first data word and configured to output a second data word, wherein the input control circuit sets the second data word equal to the first data word during normal operations, and wherein the input control circuit sets the second data word to a saturation threshold value during saturation operations; and
    a comparator circuit coupled to receive a third data word and the second data word and to provide an output data word.

2. The ALU of claim 1, wherein the comparator circuit is configured to set the output data word equal to the second data word when the third data word is greater than the second data word during saturation operations, and wherein comparator circuit is further configured to set the output data word equal to the third data word when the third data word is less than the second data word during saturation operations, wherein the saturation operations consist of unsigned saturation operations.

3. The ALU of claim 1, wherein the comparator circuit is coupled to receive an output control signal, the output control signal controlling the selection of the second data word or the third data word as the output data word.

4. The ALU of claim 3, the saturation operations consisting of unsigned saturation operations, wherein the comparator circuit comprises:
    a min/max comparator coupled to receive the second data word and the third data word, the min/max comparator being configured to output a comparator output signal; and
    an output selection circuit coupled to receive the output control signal and the comparator output signal, the output selection circuit being configured to provide either the second data word or the third data word as the output data word in response to the output control signal and the comparator output signal.

5. The ALU of claim 4, wherein the output selection circuit comprises:
    an XOR gate coupled to receive the comparator output control signal and the comparator output signal and generate a multiplexer control signal; and
    a multiplexer coupled to receive the second data word and the third data word, wherein the multiplexer is configured to output the output data word in response to the multiplexer control signal.

6. The ALU of claim 5, wherein the comparator output signal is driven to a logic HIGH state when the third data word is less than the second data word, wherein the comparator output control signal is driven to a logic HIGH state during saturation operations, wherein the first multiplexer input port comprises a LOW input terminal, and wherein the second multiplexer input port comprises a HIGH input terminal.

7. The ALU of claim 4, further comprising an output control circuit for generating the comparator output control signal when a saturation control signal is in an active state, wherein the saturation control signal is driven to an active state during saturation operations.

8. The ALU of claim 7, wherein the output control circuit comprises an OR gate coupled to receive the saturation control signal and provide the output control signal.

9. The ALU of claim 3, the saturation operations consisting of unsigned saturation operations, wherein the input control circuit comprises a multiplexer coupled to receive the first data word and the saturation threshold value, the multiplexer being configured to provide the saturation threshold value as the second data word when a saturation control signal is in an active state, the saturation, control signal being driven to an active state during saturation operations.

10. The ALU of claim 9, wherein the input control circuit further comprises a register for providing the saturation threshold value.

11. The ALU of claim 3, wherein the saturation value is equal to an upper threshold value during signed saturation operations when the third data word is positive, and wherein the saturation value is equal to a lower threshold value when the third data word is negative.

12. The ALU of claim 11, wherein the input control circuit comprises:
   an upper saturation circuit coupled to receive the first data word and the saturation control signal, wherein the upper saturation circuit is configured to set an intermediate data word equal to the upper threshold value during saturation operations, and wherein the upper saturation circuit is further configured to set the intermediate data word equal to the first data word during normal operations; and
   a lower saturation circuit coupled to receive the intermediate data word, wherein the lower saturation circuit is configured to set the second data word equal to the lower threshold value during saturation operations when the third data word is negative, and wherein the lower saturation circuit is further configured to set the second data word equal to the intermediate data word during saturation operations when the third word is not negative and during normal operations.

13. The ALU of claim 12, further comprising a negative signed saturation detect circuit for driving a negative signed saturation signal to an active state when a saturation control signal and a signed operation indicator signal are both in active states and the most significant bit (MSB) of the third data word is logic HIGH, wherein the saturation control signal is driven to an active state during saturation operations, and wherein the signed operation indicator signal is driven to an active state during signed operations.

14. The ALU of claim 13, wherein the negative signed saturation detect circuit comprises an AND gate coupled to receive the MSB of the third data word, the saturation control signals and the signed operation indicator signal, wherein the AND gate provides the negative signed saturation signal as an AND output signal, and wherein the saturation control signal and the sign operation indicator signal are both active HIGH signals.

15. The ALU of claim 14, wherein the upper saturation circuit comprises a first multiplexer coupled to receive the first data word and the upper threshold value, the first multiplexer being configured to output the upper threshold value as the intermediate data word when the saturation control signal is in an active state, and wherein the lower saturation circuit comprises a second multiplexer coupled to receive the intermediate data word and the lower threshold value, the second multiplexer being configured to output the lower threshold value as the second data value when the negative signed saturation signal is in an active state.

16. The ALU of claim 15, wherein the lower threshold value is the inverse of the upper threshold value.

17. The ALU of claim 12, wherein the min/max comparator circuit comprises:
   a first comparator input circuit coupled to receive the third data word and output a fourth data word, wherein the first comparator input circuit is configured to set the fourth data word equal to the third data word with an inverted MSB during signed saturation operations, and wherein the first comparator input circuit is further configured to set the fourth data word equal to the third data word during unsigned saturation operations and during normal operations;
   a second comparator input circuit coupled to receive the second data word and output a fifth data word, wherein the second comparator input circuit is configured to set the fifth word equal to the second data word with an inverted MSB during signed saturation operations, and wherein the second comparator input circuit is further configured to set the fifth data word equal to the second data word during unsigned saturation operations and during normal operations;
   a general purpose comparator coupled to receive the fourth data word and the fifth data word, wherein the general purpose comparator is configured to output a comparator output signal; and
   an output selection circuit coupled to receive the output control signal and the comparator output signal, the output selection circuit being configured to provide either the second data word or the third data word at the output data word in response to the output control signal and the comparator output signal.

18. The ALU of claim 17, wherein the first comparator input circuit comprises a first XOR gate coupled to receive a signed operation indicator signal and the MSB of the fourth data word, and wherein the second comparator input circuit comprises a second XOR gate coupled to receive the signed operation indicator signal and the MSB of the fifth data word, wherein the signed operation indicator signal is driven to a logic HIGH state during signed operations.

19. The ALU of claim 17, further comprising:
   a primary output control circuit [330] for setting an intermediate control signal to a first level during saturation operations; and
   a secondary output control circuit [360] coupled to receive the intermediate control signal, wherein the secondary output control circuit is configured to set the output control signal to a second level during signed saturation operations when the third data word is negative, the second level being different from the first level, and wherein the secondary output control circuit is further configured to set the output control signal equal to the intermediate control signal when the third data word is not negative.

20. The ALU of claim 19, wherein the primary output control signal comprises an OR gate coupled to receive a saturation control signal and provide the intermediate control signal, and wherein the secondary output control signal comprises an AND gate coupled to receive the intermediate control signal and the inverse of the negative signed saturation signal and provide the comparator output control signal, wherein both the saturation control signal and the negative signed saturation signal are active HIGH signals.

21. The ALU of claim 20, wherein the output selection circuit comprises:
   an XOR gate coupled to receive the comparator output control signal and the comparator output signal and generate a multiplexer control signal; and
   a multiplexer coupled to receive the second data word and the third data word, wherein the multiplexer is configured to output the output data word in response to the multiplexer control signal.

22. A microprocessor comprising:
an input control circuit for receiving a first data word and generating a second data word; and
an arithmetic logic unit (ALU) capable of performing a saturation operation and including a comparator circuit, the comparator circuit comprising:
a min/max comparator for comparing the second data word and a third data word and generating a comparator output signal; and
an output control circuit for providing either the second data word or the third data word as an output data word based on the comparator output signal and an output control signal;
wherein the arithmetic logic unit (ALU) is capable of using the comparator circuit in operations other than the saturation operation,
wherein the ALU is configured to perform unsigned saturation operations, wherein during unsigned saturation operations, the output control circuit provides the second data word as the output data word when the third data word is greater than the second data word, and provides the third data word as the output data word when the third data word is less than the second data.

23. The microprocessor of claim 22, wherein the input control circuit provides an unsigned threshold value as the second data word during unsigned saturation operations.

24. The microprocessor of claim 23, wherein the ALU is further configured to perform signed saturation operations, wherein the input control circuit provides a signed upper threshold value as the second data word when the third data word is positive during signed saturation operations, and wherein the input control circuit provides the inverse of the signed upper threshold value as the second data word when the third data word is negative during signed saturation operations.

25. The microprocessor of claim 24, wherein the input control circuit comprises:
an upper saturation circuit coupled to receive the first data word, wherein the upper saturation circuit is configured to set an intermediate data word equal to the first data word during non-saturation operations, wherein the upper saturation circuit is further configured to set the intermediate data word equal to the unsigned threshold value during unsigned saturation operations, and wherein the upper saturation circuit is further configured to set the intermediate data word equal to the signed upper threshold value during signed saturation operations; and
a lower saturation circuit coupled to receive the intermediate data word and generate the second data word, wherein the lower saturation circuit is configured to set the second data word equal to the intermediate data word during non-saturation operation, unsigned saturation operations, and signed saturation operations when the third data word is positive, and wherein the lower saturation circuit is further configured to set the second data word equal to the inverse of the intermediate data word during signed saturation operations when the third data word is negative.

26. The microprocessor of claim 25, further comprising a negative sign detect circuit for driving a negative saturation signal to an active state when a saturation control signal and a signed operation indicator signal are both in active states and the most significant bit (MSB) of the third data word is logic HIGH, wherein the saturation control signal is driven to an active state during saturation operations, and wherein the signed operation indicator signal is driven to an active state during signed operations, the negative sign detect circuit instructing the lower saturation circuit to provide the inverse of the intermediate data word as the second data word.

27. A method for performing a saturation operation on an input word in the arithmetic logic unit (ALU) of a microprocessor such that circuit area requirements of the microprocessor can be minimized without substantially degrading the performance of the microprocessor, the ALU including a comparator circuit comprising a min/max comparator, the arithmetic logic unit (ALU) being capable of using the comparator circuit in operations other than the saturation operation, the method comprising:
providing the input word to the comparator circuit;
providing a saturation threshold value to the comparator circuit, wherein the saturation threshold value comprises an unsigned threshold value when the saturation operation comprises unsigned saturation, wherein the saturation threshold value comprises an upper signed threshold value when the saturation operation comprises signed saturation and the input word is positive, and wherein the saturation threshold value comprises the inverse of the upper signed threshold value when the saturation operation comprises signed saturation and the input word is negative;
comparing the input word to the saturation threshold value using the min/max comparator; and
replacing the input word with the saturation threshold value when the input word exceeds the saturation threshold value,
wherein comparing the input word to the saturation threshold value using the min/max comparator comprises:
inverting the most significant bit (MSB) of the input word before providing the input word to the min/max comparator during signed saturation; and
inverting the MSB of the saturation threshold value before providing the saturation threshold value to the min/max comparator during signed saturation.

28. A method for performing a signed inverse limiting operation on a first input word in an arithmetic logic unit (ALU) of a microprocessor such that circuit area requirements of the microprocessor can be minimized without substantially degrading the performance of the microprocessor, the ALU including a general purpose comparator, the method comprising:
setting a second input word equal to an upper threshold value when the first input word is positive;
setting the second input word equal to the inverse of the upper threshold value when the first input word is negative;
inverting the most significant bit (MSB) of the first input word to generate a third input word;
inverting the MSB of the second input word to generate a fourth input word;
providing the third input word and the fourth input word to the general-purpose comparator;
replacing the first input word with the second input word when the first input word is positive and the general purpose comparator indicates that the third input word is not greater than the fourth input word; and
replacing the first input word with the second input word when the first input word is negative and the general-purpose comparator indicates that the third input word is greater than the fourth input word.

* * * * *